July 24, 1956 S. LUBKIN 2,756,329

BI-STABLE DEVICE

Filed Sept. 10, 1951 3 Sheets-Sheet 1

INVENTOR.
SAMUEL LUBKIN
BY Davis, Hoxie & Faithfull
HIS ATTORNEYS

INVENTOR.
SAMUEL LUBKIN
BY Davis, Hoxie & Faithfull
HIS ATTORNEYS

INVENTOR.
SAMUEL LUBKIN
BY
Davis, Hoxie & Faithfull
HIS ATTORNEYS

United States Patent Office 2,756,329

Patented July 24, 1956

2,756,329

BI-STABLE DEVICE

Samuel Lubkin, Brooklyn, N. Y., assignor, by mesne assignments, to Underwood Corporation, New York, N. Y., a corporation of Delaware Application September 10, 1951, Serial No. 245,947

17 Claims. (Cl. 250—27)

This invention relates to electronic circuits known in the art as "flip-flops," that is, circuits having two stable states. A circuit of this type, when placed in one of its stable states, will remain in that condition indefinitely or until deliberately placed in its other stable state. It may be ascertained, without disturbing the circuit's stability, which of the two conditions of stability prevails in the circuit at any particular time. A flip-flop can be transferred from one condition of stability to the other by suitable triggering means. A flip-flop thus has the ability to "remember" a past occurrence, in the sense that when the circuit is in either one of its two stable states it will remain so indefinitely; the particular state it is in, being an indication of which of two possible triggering actions last occurred. This important characteristic finds particular utility in electronic computing or counting circuits, but is also useful in other complex electronic circuits.

The various types of flip-flop circuits known to the art, while possessing certain advantages, nevertheless have certain drawbacks. The so-called "static" type of flip-flop, which was the only known electronic type for many years, consists of an Eccles-Jordan trigger circuit or modifications thereof. This circuit requires two vacuum tubes, the stable states being the condition where one tube conducts current while the other tube is cut off, and the reverse condition. The Eccles-Jordan circuit suffers from many disadvantages, among which are the need for considerable driving power, which necessitates additional buffer stages frequently consisting of two or more tubes; the need for a power amplifier if any reasonable amount of output power is to be realized; a sensitivity to transients; and a variable delay between input and output as a result of tube aging and amplitude of input. The large number of additional units needed to compensate for these disadvantages adds objectionable bulk to present day complex electronic equipment. The additional vacuum tubes required make for high maintenance costs and contribute to the frequency of failure of the circuits.

A "dynamic" type of flip-flop, developed at the National Bureau of Standards, utilizes a single tube plus an external delay line. A pulse applied to the tube is amplified, delayed in an external delay line, and fed back to the input of the tube. The two stable states consist of either no output at all, or a steady stream of pulses. Since the pulse recirculates, the slightest distortion is magnified so that without the addition of compensatory units the pulse shape would become unrecognizable and the time interval between pulses would not remain constant. Consequently, this flip-flop requires supplementary circuitry and a source of "standard" pulses to reshape and retime the pulse at each cycle so that the recurrence rate is constant and in exact synchronism with the rest of the apparatus. Moreover, set and reset pulses must also occur in precise synchronization with the standard pulse source. Many of the disadvantages inherent in the Eccles-Jordan circuit are likewise imputable to this type of circuit.

Another type of dynamic flip-flop has been developed, in one form of which a high-frequency voltage is applied to one control grid of a multigrid amplifier tube and a negative bias, normally sufficient to produce plate current cutoff, is applied to a second control grid. The output signal from the tube is rectified to produce a D. C. output signal. Application of a set signal neutralizes the cutoff bias, allowing the circuit to produce an output signal, part of which is fed back to the second control grid to maintain the output after removal of the set signal. The flip-flop is reset by applying a negative signal to the second control grid, momentarily restoring the normal cutoff condition, which is subsequently maintained because no output signal is being fed back to oppose the bias. Since both the cutoff characteristic and the normal operating range of the tube are used, the circuit cannot easily be protected against changes in characteristics resulting from tube aging or from the replacement of one tube by another. Furthermore, since both the amplifying and gating functions are combined in one device, the tube, its choice necessarily represents a compromise and imposes limitations not encountered when the two functions can be separated.

The principal object of the present invention is to provide a simple and reliable circuit which yields the advantages of prior art flip-flops while overcoming their disadvantages.

Another object of the invention is to provide a simple yet reliable flip-flop circuit which is relatively stable in operation.

A further object of the invention is to provide a bistable device which requires little driving power and yet produces an output signal which may be used without further amplification.

In the preferred form of the instant invention a bistable device is provided, wherein a "set" signal is applied to a controllable A. C. source to produce an output signal. The output signal from the controllable A. C. source is applied to the input of an amplifier, where it is amplified, and then rectified, the rectified output signal appearing as a D. C. potential of a given value at the output terminals. The rectified output signal is also fed back to keep the controllable A. C. source energized, the "set" signal being then no longer needed. This is one of the stable states. To produce the other stable state, another signal called a "reset signal," is applied to a line, so as to interrupt the feed-back signal, whereby a D. C. potential of another materially different value appears at the output terminals of the device.

A feature of the invention is the use of a gating circuit independent of the amplifier to interrupt the feed-back signal when a "reset signal" is received. The advantage of this feature is that separate circuits are provided for the gating and amplification functions so that optimum performance is achieved.

Another advantage of the invention is that separate set and reset input terminals are available so that "set and reset signals" can be received from different sources.

For a better understanding of the invention, reference may be had to the accompanying drawings in which Fig. 1 is a block diagram showing one possible arrangement of the modulator flip-flop (set predominating type);

Figure 1:
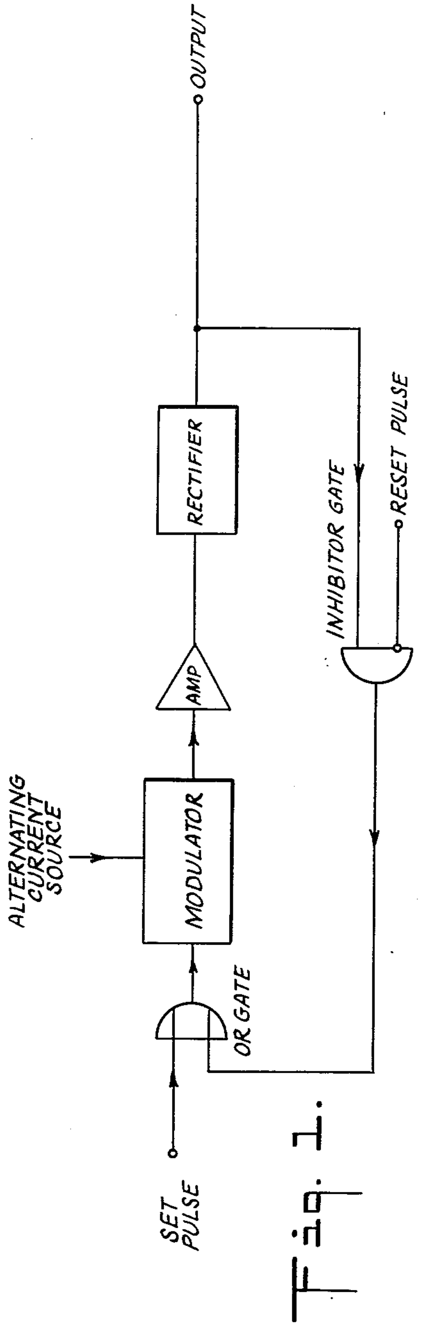

In Fig. 1 there is shown, in block form, the modulator flip-flop (set predominating), in accordance with one embodiment of the instant invention. The flip-flop is called "set" when the D. C. potential appearing at the output approximates a given value. This is one of the two stable states. The flip-flop is "reset" when it is in its other stable state, during which the D. C. potential at the output approximates another, materially different, value. To initiate the "set" state, a "set" pulse is introduced at the line marked "set" and passes through an "or" gate, a device which permits a pulse on any one or more of its inputs to pass through. The pulse is then applied to a modulator where it causes an A. C. potential (from a high-frequency source, that is, high compared to the minimum time interval between successive operations) to be transmitted to the output of the modulator. Thus, the modulator functions as a gate or switch to pass the high-frequency voltage to the amplifier in the presence of an input signal. This high frequency voltage from the modulator is amplified and then rectified, appearing as a steady voltage at the output. The output voltage is fed back through an "inhibitor" gate, a device which permits it to pass so long as no pulse is present on the line marked "reset pulse." The voltage passes through the "or" gate and so takes over the function of the "set-pulse" which now need no longer be present. The flip-flop is now "set" and will maintain a steady voltage at the output until it is "reset." Resetting of the flip-flop is accomplished by introducing an appropriate pulse at the "inhibitor" gate. This causes an interruption in the connection between the output, and the "or" gate. Without this voltage (assuming no new set-pulse is present) the high-frequency voltage no longer appears at the modulator output and the amplifier output drops to zero. The flip-flop is now "reset" and will remain this way until another set-pulse replaces it in the "set" state. In the "reset" condition, another and different D. C. potential appears at the output terminals of the circuit, a D. C. source in the feedback path having its circuit completed through the output terminals so as to supply the necessary potential.

If, in Fig. 1, a pulse appears at both the set and reset terminals simultaneously, the "flip-flop" will set. This is true because the reset pulse acts only on the feedback path and does not prevent the set pulse from actuating the circuit in the usual manner. Furthermore, because of capacitance present in the circuit, it will tend to remain in the set condition even when both pulses are simultaneously removed; if the circuit capacitances are properly chosen, the feedback will be established after removal of the reset pulse and before the decay of the output signal. Once feedback is established, the circuit will remain in the set state as previously described. This circuit is called "set predominating."

Figure 2:
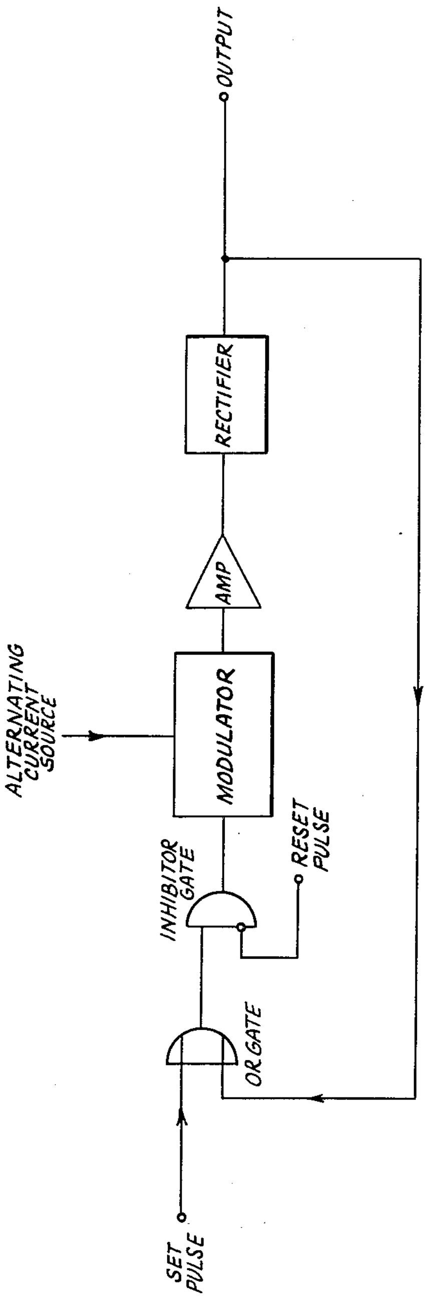
Fig. 2 is a block diagram showing one possible arrangement of the modulator flip-flop (reset predominating type)

Fig. 2 shows a "reset predominating" arrangement whereby, if both pulses occur together, the "flip-flop" resets. It will be observed that the "inhibitor gate" is interposed between the "or" gate and the modulator. The presence of a "reset" pulse thus prevents the set pulse from affecting the modulator, so the reset predominates. On simultaneous removal of both pulses the circuit will remain reset as there is no signal present at any point to cause setting. In all other respects, the two arrangements are identical in performance.

Figure 3:
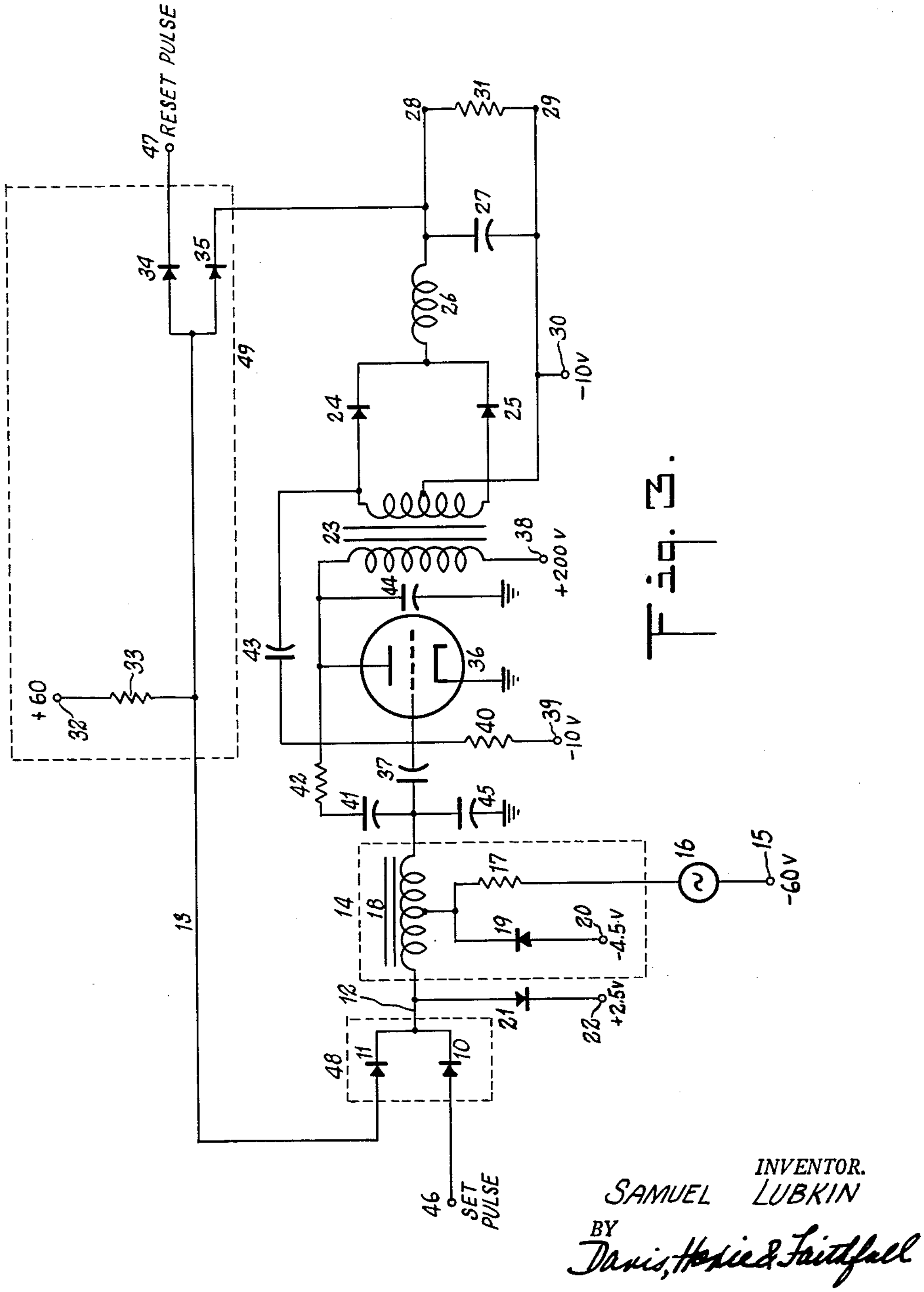
Fig. 3 is a circuit diagram of the modulator flip-flop in accordance with Fig. 1.

Referring now to Fig. 3, there is shown a circuit diagram of the modulator flip-flop in accordance with one embodiment of the invention. The "or" gate 48 comprises a pair of germanium crystal diodes 10 and 11 having their negative terminals connected to line 12. Diode 11 is positioned in the feedback path 13 of the device. The positive terminal of diode 10 is connected to the "set" signal receptor 46 (marked "set-pulse") and is arranged for receiving a suitable triggering pulse of positive polarity from a source not shown in the drawing.

Through line 12 the "or" gate 48 is connected to a modulator shown generally at 14. The modulator includes a resistance 17, an auto-transformer 18, a germanium crystal diode 19, and a source of D. C. potential 20. The modulator is supplied with an alternating current source 16, source 16 and a source of D. C. potential 15 being connected in series with resistance 17. The source 16 is of a frequency, high as compared with the minimum interval between "set" and "reset" pulses. These signal pulses occur at random times, but in a particular device, one will be able to predict the minimum time interval between successive pulses. In order to simplify the explanation of the invention, all D. C. potential sources used throughout this circuit have been indicated by their individual magnitudes and polarities. It will be understood of course that these magnitudes and polarities are not critical and the invention is not so limited, the particular values given being by way of illustration only. Since the flip-flop may be designed to be used as one component of a complex electronic circuit combination, it will be readily understood that the requisite D. C. potentials may be supplied from various other circuits of the said complex circuit combination.

The tap on the auto-transformer 18 branches into two parallel paths, one path including the resistance 17, and the other path comprising the germanium crystal diode 19, the positive terminal of which is connected to the source of negative potential 20, while the negative terminal of the diode 19 is connected to the tap on transformer 18. The input end of the modulator 14 is connected to line 12, and the output end is connected via coupling condenser 37 to the grid of triode 36. If desired the autotransformer 18 may be replaced by a reactor, in which case the two parallel paths are connected to the output end of the reactor.

Interposed between the "or" gate 48 and the modulator 14 is a germanium crystal diode 21, the positive terminal of which is tapped on line 12, while the negative terminal is connected to a source of positive potential 22. The diode 21 and potential source 22 serve as a clamping circuit, that is it prevents the set-pulse or the feedback signal from going too high. In addition diode 21 provides a return circuit for the high-frequency signals when they are present in the autotransformer windings. The output of the modulator 14 is fed to the grid of a vacuum amplifier tube or triode 36, by means of coupling condenser 37, the purpose of condenser 37 being to isolate the grid bias voltage 39, supplied through resistor 40, from the modulator potentials. The amplified output from triode 36 is taken from the plate and applied to the primary of transformer 23. The secondary circuit of the transformer 23 contains a rectifier comprising a pair of germanium crystal diodes 24 and 25, the diodes having their positive terminals connected to the transformer secondary, the negative terminals thereof being connected to one side of an inductance 26, the other side of inductance 26 being connected to output terminal 28. A source of negative potential 30 is connected to a tap on transformer 23 and to the other output terminal 29. Between the output terminals 28 and 29 a useful load 31 is connected. Shunted across the output terminals 28, 29 is a capacity 27 which, with the inductance 26, forms a filter circuit for the output of the rectifier.

An inhibitor gate 49 is connected in the feedback path 13 of the modulator flip-flop. The inhibitor gate 49 comprises D. C. source 32, resistance 33 and germanium crystal diodes 34, 35. The negative terminal of diode 34 is connected to the reset signal receptor 47 (marked "reset pulse") and is arranged for receiving a suitable triggering pulse of negative polarity from a source not shown on the drawing. The negative terminal of diode 35 is connected to output terminal 28 as shown. The source of D. C. potential 32 is connected through resistor 33 to the positive terminals of the diodes 34 and 35 and to the positive terminal of diode 11 as shown in the drawing.

The amplifier circuit of triode 36 is well known in the art, and comprises a source of plate potential 38, a source of grid potential 39 and a resistor 40. The cathode is maintained at ground potential. The plate of triode 36 is coupled to the grid by a negative feedback path comprising capacity 41 and resistance 42. The negative feedback path tends to make the output of the triode 36 constant irrespective of changes in tube characteristics. A neutralizing condenser 43 is connected between the grid of triode 36 and the secondary of transformer 23, the purpose of this capacity being to neutralize the interelectrode capacity between the grid and plate of tube 36, thus preventing parasitic oscillation and helping to maintain constant the input capacity of the tube. A condenser 44 is connected between the plate and ground, and a condenser 45 is connected between the grid of tube 36 and ground. These condensers may not be physically inserted in the circuit if the existing capacities between plate and ground and between grid and ground, respectively, are of sufficient magnitude as will be explained later.

The operation of the modulator flip-flop is as follows: before a set-pulse arrives, high-frequency source 16 is shunted through low impedance diode 19 and potential source 20. The auto-transformer 18 is thus not energized i. e., no voltage appears across the primary thereof, so that no signal voltage is applied to the grid of tube 36, and hence the output is zero. Looking now at the D. C. aspect of the system, it is evident that diode 10 is not conducting since there is no set-pulse at the set signal receptor 46. Diode 21 is also not conducting since its positive terminal is at —4½ v. (because of source 20), and its negative terminal is at +2½ v. The circuit for diode 19 may be traced from source 20, diode 19, resistance 17, high-frequency source 16 to negative potential source 15.

In order to protect the device against cumulative accidental feedback which could cause spurious settings of the device, a differential or threshold potential is maintained between line 13 and line 12, this differential being larger than any expected noise level. Line 13 is at a potential determined by resistors 31 and 33 and by potential sources 30 and 32, the circuit being completed through diode 35. These values are chosen so as to make the potential of line 13 about —10 v. Line 12 of course is maintained at a value of —4.5 v. (because of source 20), so that the threshold potential is —5.5 v. Diode 11 thus does not conduct, since its positive terminal is at —10 v. and its negative terminal is at —4.5 v. Furthermore, it will not conduct until the potential of line 13 exceeds —4.5 v.; no feedback can therefore occur for small output signals such as might be caused by circuit noise or accidental pickup from adjacent circuits. Thus the device is protected against cumulative accidental feedback which could cause spontaneous or accidental setting.

When a set-pulse arrives at the line 46 marked "set-pulse" it causes diode 10 to conduct. In one particular embodiment, the set-pulse reference level was —5 v. and a 10 v. positive pulse was used, lasting for more than 1 microsecond, although these values are to be regarded merely as representative. This pulse attempts to raise the potential of the negative terminal of diode 19 to +5 v., but clamping diode 21 limits this potential to about +2½ v. Diode 19 is now non-conducting since now its negative end is more positive than its positive end. The high-frequency voltage from source 16 is thus applied to the primary of transformer 18, where it is amplified and supplied to the grid of tube 36 via coupling condenser 37. Thus, the modulator 14 functions as a gate to pass an alternating current signal to the tube 36 when one input pulse is present. The output from tube 36 is taken from the plate and applied to the primary of transformer 23, the voltage appearing across the secondary being rectified by the diodes 24, 25, and filtered by the filter circuit 26, 27 so as to smooth out any ripples in the rectified output. Output terminal 28 now is raised to about +5 v., by the rectified signal, the flip-flop being now "set." Since the negative terminal of diode 35 is tied to the output terminal 28, it now rises to about +5 v., so that the potential of its positive terminal is negative with respect to its negative terminal and diode 35 becomes non-conducting. It will be recalled that before the arrival of the set-pulse diode 11 was non-conducting. The circuit for the D. C. source 32 is now completed through diode 11, so that the negative terminal of diode 19 is maintained at +2½ v., and the high-frequency voltage from source 16 is continuously supplied to the primary of transformer 18. The modulator flip-flop is now "set" and will maintain indefinitely a steady D. C. voltage at output terminals 28, 29 until it is "reset."

In order to reset the flip-flop, a pulse is applied to the reset signal receptor 47 (marked "reset pulse"). Prior to the arrival of the "reset" pulse, the feedback path was at +2½ v. The presence of the "reset" pulse causes this voltage to drop to —10 v., and diode 11 ceases to conduct since its positive terminal is now at —10 v. The negative terminal of diode 19 thus is no longer maintained at +2.5 v., so that diode 19 thus becomes conducting again, and the high-frequency source 16 is shunted through it to potential source 20. The D. C. source 32 completes its circuit through diode 34 and the line marked "reset pulse," until the output signal disappears, at which time the circuit from source 32 is completed through diode 35. High-frequency voltage no longer appears at the modulator output and the amplifier output falls to zero. The circuit is now reset and will remain "reset" until it is placed in the "set" state.

Two possible situations should now be distinguished: first when "set" and "reset" signals are applied simultaneously and, second, when "set" and "reset" signals are simultaneously removed from the circuit shown in Fig. 3. In the first case, where the signals are applied simultaneously, the set signal itself is enough to hold line 12 at a positive potential and thus render diode 19 non-conducting so that the high-frequency voltage from source 16 is applied to the primary of transformer 18. The feedback does not add or change the potential of line 12. In the second situation, the potential of output terminal 28 with respect to 29 cannot change instantly because of the circuit capacitance, particularly condenser 27. Therefore the output signal persists for an appreciable interval of time, even though this time is in the order of micro-seconds. At any instant of time after the removal of the signals, the output potential associated with the set signal will appear. The removal of the reset signal permits the output to feed back through diode 11 and thus maintain line 12 at a positive potential. Hence, this circuit is called "set" predominating.

In order to obtain the maximum power transfer through the circuit, impedance matching is used. The transformer 18 and condenser 45 present a high impedance to the high frequency, and so a better output is obtained. In a similar manner transformer 23 resonates condenser 44, the primary winding being the inductance, so that maximum impedance is presented to the high impedance source (tube 36). In both cases condensers 44 and 45 may or may not be physically present in the circuit, since the capacity existing between the plate and ground and between the grid and ground, respectively, may be sufficient for this purpose.

Figure 4:
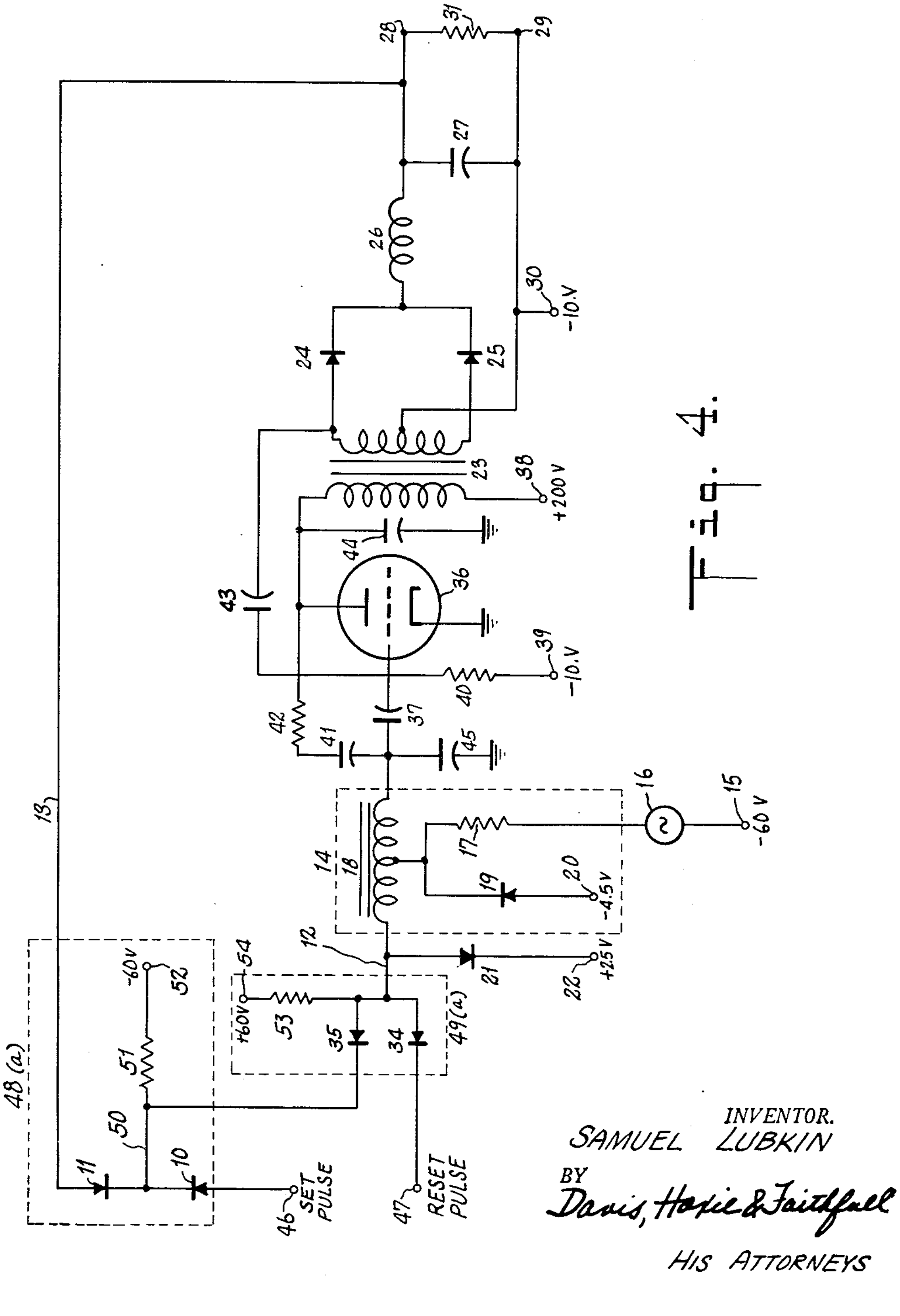
Fig. 4 is a circuit diagram of the modulator flip-flop in accordance with Fig. 2.

Fig. 4 shows a circuit diagram of another embodiment of the invention. This is a reset-predominating type, in accordance with Fig. 2. In this embodiment the arrangement of the circuit elements is substantially the same as that of Fig. 3 with the exception that the inhibitor gate **49*a* is interposed between the "or" gate 48*a* and the modulator 14. The "or" gate 48*a* comprises germanium crystal diodes 10 and 11, resistance 51, and D. C. potential source 52. The positive terminal of diode 10 is connected to the set signal receptor 46 (marked "set pulse"). The positive terminal of diode 11 is connected to output terminal 28, while its negative terminal and the negative terminal of diode 10 are connected to resistance 51 and D. C. source 52, through line 50. The "inhibitor" gate 49***a* comprises germanium crystal diodes 34, 35, resistance 53 and D. C. potential source 54. The negative terminal of diode 34 is connected to reset signal receptor 47 (marked "reset pulse") and its positive terminal is connected to line 12. The negative terminal of diode 35 is connected to line 50 and its positive terminal is connected to line 12. D. C. potential source 54 and the resistance 53 in series therewith are also tied to line 12.

In operation this circuit is substantially similar to the circuit of Fig. 3; such differences as do exist will be apparent from the following explanation. With the circuit in its reset condition and no set or reset input signals present, line 50 will be at about −10 v. being held there by the combination of resistor 51, voltage 52, and the no-signal levels of the set input 46 and the output 28. Line 12 will be held at approximately this same potential through diode 35, so that the modulator will not give an output signal.

Application of a positive set pulse at 46 will raise point 50, through diode 10, to approximately the same potential as 46; for example, to +5 v. This will allow resistor 53 and potential source 54 to raise line 12 to +2½ v., where it will be clamped by diode 21, and the modulator can then give an output. The resulting D. C. output signal at 28 will in turn maintain line 50 at its higher level, through diode 11, after removal of the set signal, and the circuit will remain in the set condition.

Input terminal 47 is normally maintained at or above +2½ v., so diode 34 does not normally conduct. A reset signal changes the potential at 47 to about —10 v. Diode 34 then conducts and holds line 12 down to approximately this same potential, causing the modulator output to be interrupted; the circuit will then return to its reset condition.

As before two situations will be differentiated: first, when "set" and "reset" signals are simultaneously applied, and second, when the "set" and "reset" signals are simultaneously removed. If both set and reset signals are applied simultaneously, line 50 is held at +5 v. as a result of the set pulse through diode 10; however, line 12 is prevented from assuming this potential, being held to —10 v. by the reset pulse through diode 34. Under these conditions diode 35 does not conduct since its positive end is at the lower potential (—10 v.). Thus with both signals present, the "reset" signal predominates and the device "resets." When both signals are removed simultaneously, the circuit remains in the reset condition since the potential associated with the reset signal persists due to circuit capacitance, and there is now no set signal present at any point in the circuit to cause setting.

While the specification refers to "pulses" for set and reset, this is only because of one usual application in computers. Any shape or duration of signal which exceeds in magnitude and duration that for which the circuit is designed will operate it equally well. This is a distinct advantage over certain prior art types of flip-flops which in many applications require auxiliary pulse forming apparatus of particular rise times and durations for consistent and successful operation.

The fact that it is the high-frequency voltage which is amplified, rather than the signal, enables use of transformer coupling, thus permitting impedance matching and gaining full power from the tube. By the use of a relatively high-frequency source as a carrier, the transformers may be made very small, yet efficient. More than one secondary winding may be used in the transformer so that simultaneous outputs at different voltages may be obtained if desired. The use of transformer coupling also permits choice of a D. C. output potential level which is consistent with that of the input, thus facilitating feedback circuit design.

In the embodiment shown in Fig. 3 the "circuit loop" specified in the accompanying claims includes the following principal components (plus such auxiliary elements needed to make the loop electrically conductive): 12, 14, 36, 24, 25, 35, 13 and 11. In a similar manner the "circuit loop" in the embodiment of Fig. 4 includes: 12, 14, 36, 24, 25, 13, 11 and 35. In both the embodiments shown in Figs. 3 and 4, the "crystal diodes" specified in the accompanying claims can be any unilateral impedance element.

It should be noted that many variations of the basic device are possible, and these will be apparent to those skilled in the art. In particular, the diodes can be rearranged and suitable potentials chosen to permit the use of either positive or negative pulses for set and reset, and the "inhibitor" and "or" gates may be resistor networks or other devices rather than diodes. The reset pulse can be introduced at any desired point in the circuit, since its function is to counteract the signal present when the device is in the set condition; thus it is possible to employ a reset signal of either polarity and obtain it from either a relatively high or relatively low impedance source. The modulator may be any device permitting the control of an alternating current signal by a D. C. potential such as a gate, and the amplifying element may be a transistor, magnetic amplifier, or other device rather than a thermionic vacuum tube. In general, it is the intention of the inventor to cover all such changes and modifications of the circuits described in the foregoing specifications which do not constitute departures from the spirit and scope of the invention.

I claim:

1. A bi-stable device comprising a controllable alternating current source having input and output means, a set signal source connected to said input means to provide a set signal, an alternating current output signal appearing on said output means when a set signal is impressed on said input means, a rectifier having input and output means, the output means of the alternating current source being connected to the input means of said rectifier, said rectifier converting the alternating current signal to a direct current signal, a feedback path connected between the output means of said rectifier and the input means of said alternating current source, said feedback means maintaining a feedback signal on the input means of said alternating current source after termination of the set signal, the feedback signal maintaining the direct current signal at the output means of said rectifier to establish a first stable state, and circuit interrupting means connected to said feedback path to interrupt the feedback to decrease the magnitude of the direct current signal at the output means of said rectifier to establish a second stable state.

2. A bi-stable device comprising a controllable alternating current source having input and output means, a set signal source connected to said input means to provide a set signal, an alternating current output signal appearing on said output means when a set signal is impressed on said input means, a rectifier having input and output means, the output means of said alternating current source being connected to the input means of said rectifier, said rectifier converting the alternating current signal to a direct current signal, a feedback path connected between the output means of said rectifier and the input means of said alternating current source, said feedback means maintaining a feedback signal on the input means of said alternating current source after termination of the set signal, the feedback signal maintaining the direct current signal at the output means of said rectifier to establish a first stable state, and circuit interrupting means connected between the set signal source and the input means of said alternating current source to decrease the magnitude of the direct current signal at the output means of said rectifier to establish a second stable state.

3. A bi-stable device comprising a controllable alternating current source having input and output means, a set signal source connected to said input means to provide a set signal, an alternating current output signal appearing on said output means when a set signal is impressed on said input means, an amplifier having input and output means, the output means of said alternating current source being connected to the input means of said amplifier, a rectifier having input and output means, the input means of said rectifier being connected to the output means of said amplifier, said rectifier converting the alternating current signal to a direct current signal, a feedback path connected between the output means of said rectifier and the input means of said alternating current source, the said feedback path maintaining a feedback signal on the input means of said alternating current source after the termination of the set signal, the feedback signal maintaining the direct current signal at the output means of said rectifier to establish a first stable state, and gating means in series with said feedback path to terminate the feedback signal.

4. A bi-stable device comprising a controllable alternating current source having input and output means, a set signal source connected to said input means to provide a set signal, an alternating current output signal appearing on said output means when a set signal is impressed on said input means, an amplifier having input and output means, the output means of said alternating current source being connected to the input means of said amplifier, a rectifier having input and output means, the input means of said rectifier being connected to the output means of said amplifier, said rectifier converting the alternating current signal to a direct current signal, a feedback path connected between the output means of said rectifier and the input means of said alternating current source, said feedback path maintaining a feedback signal on the input means of said alternating current source after the termination of the set signal, the feedback signal maintaining the direct current signal at the output means of said rectifier to establish a first stable state, circuit interrupting means connected in series with said feedback path to interrupt the feedback signal to decrease the magnitude of the direct current signal at the output means of said rectifier to establish a second stable state, and utilization means connected to the output means of said rectifier.

5. A bi-stable device comprising a controllable alternating current source having input and output means, a set signal source connected to said input means to provide a set signal, an alternating current output signal appearing on said output means when a set signal is impressed on said input means, an amplifier having input and output means, the output means of said alternating current source being connected to the input means of said amplifier, a rectifier having input and output means, the input means of said rectifier being connected to the output means of said amplifier, said rectifier converting the alternating current signal to a direct current signal, a feedback path connected between the output means of said rectifier and the input means of said alternating current source, said feedback path maintaining a feedback signal on the input means of said alternating current source after the termination of the set signal, the feedback signal maintaining the direct current signal at the output means of said rectifier to establish a first stable state, gating means connected in series with said feedback path to interrupt the feedback signal, and a reset signal source connected to said gating means to provide a reset signal, the reset signal causing said gating means to interrupt the feedback signal to change the magnitude of the direct current signal at the output means of said rectifier to establish a second stable state.

6. A bi-stable device comprising a modulator having first input means, second input means, and output means, a set signal source connected to said first input means to provide a set signal, an alternating current source connected to said second input means, an alternating current output signal appearing on said output means when a set signal is impressed on said first input means, an amplifier having input and output means, the output means of said modulator being connected to the input means of said amplifier, a rectifier having an input and output means, the input means of said rectifier being connected to the output means of said amplifier, said rectifier converting the alternating current signal to a direct current signal, and gating means connected between the output means of said rectifier and the first input means of said modulator, said gating means selectively maintaining a feedback signal on the first input means of said modulator after the termination of the set signal, the feedback signal maintaining the direct current signal at the output means of said rectifier to establish a first stable state.

7. A bi-stable device comprising a modulator having a first input means, a second input means, and an output means, a set signal source connected to first input means to provide a set signal, an alternating current source connected to said second input means, an alternating current output signal appearing on said output means when a set signal is impressed on said first input means, an amplifier having input and output means, the output means of said modulator being connected to the input means of said amplifier, a rectifier having an input and output means, the input means of said rectifier being connected to the output means of said amplifier, said rectifier converting the alternating current signal to a direct current signal, gating means connected between the output means of said rectifier and the first input means of said modulator, said gating means maintaining a feedback signal on the first input means of said modulator after the termination of the set signal, the feedback signal maintaining the direct current signal at the output means of said rectifier to establish a first stable state, and a reset signal source connected to said gating means to provide a reset signal, the reset signal causing said gating means to interrupt the feedback signal to decrease the magnitude of the direct current signal at the output means of said rectifier to establish a second stable state.

8. A bi-stable device comprising a modulator having a first input means, a second input means, and an output means, a set signal source connected to said first input means to provide a set signal, an alternating current source connected to said second input means, an alternating current output signal appearing on said output means when a set signal is impressed on said first input means, an amplifier having input and output means, the output means of said modulator being connected to the input means of said amplifier, a rectifier having an input and output means, the input means of said rectifier being connected to the output means of said amplifier, the said rectifier converting the alternating current signal to a direct current signal, a feedback path connected between the output means of said rectifier and the first input means of said modulator, said feedback path maintaining a feedback signal on the first input means of said modulator after the termination of the set signal, the feedback signal maintaining the direct current signal at the output means of said rectifier to establish a first stable state, circuit interrupting means connected in series with said feedback path, a reset signal source connected to said circuit interrupting means to provide a reset signal, the reset signal causing said circuit interrupting means to interrupt the feedback signal, and an output connection connected to the output means of said rectifier, the presence of a signal on the said output connection denoting the first stable state, and the absence of a signal on the said output connection denoting a second stable state.

9. A bi-stable device comprising a modulator having first input means, second input means, and output means, a set signal source connected to said first input means to provide a set signal, an alternating current source connected to said second input means, an alternating current output signal appearing on said output means when a set signal is impressed on said first input means, an amplifier having input and output means, the output means of said modulator being connected to the input means of said amplifier, a rectifier having an input and output means, the input means of said rectifier being connected to the output means of said amplifier, said rectifier converting the alternating current signal to a direct current signal, a feedback path connected between the output means of said rectifier and the first input means of said modulator, said feedback path maintaining a feedback signal on the first input means of said modulator after termination of the set signal, the feedback signal maintaining the direct current signal at the output means of said rectifier to establish a first stable state, circuit interrupting means connected in series with said feedback path, a reset signal source connected to said circuit interrupting means to provide a reset signal, the reset signal causing said circuit interrupting means to interrupt the feedback signal, an output connection connected to the output means of said rectifier, the presence of a signal on said output connection denoting the first stable state, the absence of a signal on said output connection denoting a second stable state, the impression of a set signal on the first input means of said modulator establishing the first stable state, the impression of a reset signal on said circuit interrupting means terminating the first stable state and establishing the second stable state.

10. Apparatus comprising: a modulator having first input means, second input means, and output means; a set signal source connected to said first input means to provide a set signal; an alternating current source connected to said second input means, an alternating current output signal appearing on said output means when a set signal is impressed on said first input means; an amplifier having input and output means, the output means of said modulator being connected to the input means of said amplifier; a rectifier having input and output means, the input means of said rectifier being connected to the output means of said amplifier, said rectifier converting the alternating current signal to a direct current signal, feedback means connected between the output means of said rectifier and the first input means of said modulator, said feedback means maintaining a feedback signal on the first input means of said modulator after termination of the set signal, the feedback signal maintaining the direct current signal at the output means of said rectifier to establish a first stable state, said modulator comprising a reactor, one end of said reactor being the first input means of said modulator, an intermediate point of said reactor being the second input means of said modulator, the other end of said reactor being the output means of said modulator, a first direct current source, a unilateral conductor having one end of predetermined polarity connected to said first direct current source, the other end of said unilateral conductor being connected to the intermediate point of said reactor, a resistance element, one end of said element being connected to the intermediate point of said reactor, and a second source of direct current potential, said alternating current source connecting said remaining end of resistance element to the said second direct current source.

11. Apparatus comprising: a modulator having first input means, second input means, and output means; a set signal source connected to said first input means to provide a set signal; an alternating current source connected to said second input means, an alternating current output signal appearing on said output means when a set signal is impressed on said first input means; an amplifier having input and output means, the output means of said modulator being connected to said input means of the amplifier; a rectifier having an input and output means, the input means of said rectifier being connected to the output means of said amplifier, said rectifier converting the alternating current signal to a direct current signal, feedback means connected between the output means of said rectifier and the first input means of said modulator, said feedback means maintaining a feedback signal on the first input means of said modulator after termination of the set signal, the feedback signal maintaining the direct current signal at the output means of said rectifier to establish a first stable state, said modulator comprising an inductance having a tap thereon, tap being the said second input means of said modulator, one end of said inductance being the first input means of said modulator, the other end of said inductance being the output means of said modulator, a first direct current source, a unilateral conductor having one end of predetermined polarity connected to said first direct current source, the other end of said unilateral conductor being connected to said tap, a resistance element, one end of said element being connected to the said tap; and a second source of direct current potential, said alternating current source connecting the remaining end of said resistance element to said second direct current source.

12. Apparatus comprising a modulator having first input means, second input means, and output means, a set signal source connected to said first input means to provide a set signal, an alternating current source connected to said second input means, an alternating current output signal appearing on said output means when a set signal is impressed on said first input means, an amplifier having input and output means, the output means of said modulator being connected to the input means of said amplifier, a rectifier having an input and output means, the input means of said rectifier being connected to the output means of said amplifier, said rectifier converting the alternating current signal to a direct current signal, feedback means connected between the output means of said rectifier and the first input means of said modulator, said feedback means maintaining a feedback signal on the input means of said modulator after termination of the set signal, the feedback signal maintaining the direct current signal at the output means of said rectifier to establish a first stable state, and a unilateral conductor having one end of predetermined polarity, said set signal source being connected to said one end, the other end of said unilateral conductor being connected to the first input means of said modulator.

13. Apparatus comprising: a modulator having a first input means, second input means, and output means; a set signal source connected to said first input means to provide a set signal; an alternating current source connected to said second input means, an alternating current output signal appearing on said output means when a set signal is impressed on said first input means; an amplifier having input and output means, the output means of said modulator being connected to the input means of said amplifier; a rectifier having an input and output means, the input means of said rectifier being connected to the output means of said amplifier; said rectifier converting the alternating current signal to a direct current signal, feedback means connected between the output means of said rectifier and the first input means of said modulator, said feedback means maintaining a feedback signal on the first input means of said modulator after termination of the set signal, the feedback signal maintaining the direct current signal at the output means of said rectifier to establish a first stable state, and clamping circuit means interposed between said set signal source and the first input means of said modulator, said clamping means comprising a unilateral conductor having one end of predetermined polarity connected to the first input means of said modulator, a source of direct current potential, the other end of said unilateral conductor being connected to said source of direct current potential, whereby the amplitudes of said set signal and said feedback signal are limited.

14. Apparatus comprising: a modulator having first input means, second input means, and output means; a set signal source connected to said first input means to provide a set signal; an alternating current source connected to said second input means, an alternating current output signal appearing on said output means when a set signal is impressed on said first input means; an amplifier having input and output means, the output means of said modulator being connected to the input means of said amplifier, a rectifier having input and output means, connecting means connecting the input means of said rectifier to the output means of said amplifier, said rectifier converting the alternating current signal to a direct current signal, feedback means connected between the output means of said rectifier and the first input means of said modulator, said feedback means maintaining a feedback signal on the first input means of said modulator after termination of the set signal, the feedback signal maintaining the direct current signal at the output means of said rectifier to establish a first stable state, said connecting means comprising a transformer having a primary winding and a secondary winding, the output means of said amplifier being connected to the primary winding of said transformer, the input means of said rectifier being connected to the secondary winding of said transformer, said secondary winding having two ends and a tap; said rectifier comprising a first unilateral conductor having one end of predetermined polarity connected to one end of the secondary winding of said transformer, a second unilateral conductor having one end of predetermined polarity connected to the other end of said transformer, the output means of said rectifier comprising a first output terminal and a second output terminal, the other ends of said unilateral conductors being connected to the first output terminal of said rectifier, a source of direct current potential connected to the second output terminal of said rectifier, said second output terminal being connected to the tap of said transformer, and a resistance element connected between said first and second output terminals.

15. A bi-stable device comprising a modulator having first input means, second input means, and output means, a set signal source connected to said first input means to provide a set signal, an alternating current source connected to said second input means, an alternating current output signal appearing on said output means when a set signal is impressed on said first input means; an amplifier having input and output means, the output means of said modulator being connected to the input means of said amplifier; a rectifier having an input and output means, the input means of said rectifier being connected to the output means of said amplifier, said rectifier converting the alternating current signal to a direct current signal, feedback means connected between the output means of said rectifier and the first input means of said modulator, said feedback means maintaining a feedback signal on the first input means of said modulator after termination of the set signal, the feedback signal maintaining the direct current signal at the output means of said rectifier to establish a first stable state, circuit interrupting means connected to said feedback means, a reset signal source connected to said circuit interrupting means to provide a reset signal, the reset signal causing said circuit interrupting means to interrupt the feedback signal to decrease the magnitude of the direct current signal at the output means of said rectifier to establish a second stable state, a first unilateral conductor having one end of predetermined polarity connected to the said interrupting means, the connection between the set signal source and said first input means of said modulator, including a second unilateral conductor, said second unilateral conductor having one end of predetermined polarity connected to said set signal source, the other ends of the said unilateral conductors being connected to the first input means of the said modulator.

16. A bi-stable device comprising a controllable alternating current source and a rectifier in series relation, said controllable alternating current source having an input, a set signal source connected to said input of said controllable alternating current source, the occurrence of a set signal at said input of said controllable alternating current source producing a direct current signal at the output of said rectifier, feedback means connecting the output of said rectifier to the input of said controllable alternating current source to establish a circuit loop, said feedback means providing a feedback signal at said input of said controllable alternating current source to supersede the set signal after termination thereby maintaining the circuit loop signal and therefore the direct current signal at the output of said rectifier to establish a first stable state, a reset signal source independent of said set signal source, and circuit interrupting means connected between said reset signal source and said circuit loop and responsive to a reset signal for interrupting the circuit loop signal and decreasing the magnitude of the direct current output signal to establish a second stable state.

17. A bi-stable device comprising a controllable alternating current source, an amplifier and a rectifier in series relation, said controllable alternating current source having an input, a set signal source connected to said input of said controllable alternating current source, the occurrence of a set signal at said input of said controllable alternating current source producing a direct current signal at the output of said rectifier, feedback means connecting the output of said rectifier to the input of said controllable alternating current source to establish a circuit loop, said feedback means providing a feedback signal at said input of said controllable alternating current source to supersede the set signal after termination thereby maintaining the circuit loop signal and therefore the direct current signal at the output of said rectifier to establish a first stable state, a reset signal source independent of said set signal source, and circuit interrupting means independent of said amplifier connected between said reset signal source and said circuit loop and responsive to a reset signal for interrupting the circuit loop signal and decreasing the magnitude of the direct current output signal to establish a second stable state.

References Cited in the file of this patent

UNITED STATES PATENTS

| | | |
|---|---|---|
| 2,497,883 | Harris | Feb. 21, 1950 |
| 2,512,750 | Potter | June 27, 1950 |
| 2,583,711 | Scowen | Jan. 29, 1952 |